United States Patent
Huettel

(10) Patent No.: US 10,236,546 B2
(45) Date of Patent: Mar. 19, 2019

(54) METHOD FOR PRODUCING A PLATE-SHAPED HEAT EXCHANGER, PLATE-SHAPED HEAT EXCHANGER, AND ASSEMBLY COMPRISING PLATE-SHAPED HEAT EXCHANGERS

(71) Applicant: DR. SCHNEIDER KUNSTSTOFFWERKE GMBH, Kronach (DE)

(72) Inventor: Bernd Huettel, Naila (DE)

(73) Assignee: DR. SCHNEIDER KUNSTSTOFFWERKE GMBH (DE)

( * ) Notice: Subject to any disclaimer, the term of this patent is extended or adjusted under 35 U.S.C. 154(b) by 132 days.

(21) Appl. No.: 15/115,611

(22) PCT Filed: Jan. 27, 2015

(86) PCT No.: PCT/EP2015/051605
§ 371 (c)(1),
(2) Date: Jul. 29, 2016

(87) PCT Pub. No.: WO2015/117865
PCT Pub. Date: Aug. 13, 2015

(65) Prior Publication Data
US 2017/0077568 A1 Mar. 16, 2017

(30) Foreign Application Priority Data
Feb. 4, 2014 (DE) .......... 10 2014 101 358

(51) Int. Cl.
*H01M 10/00* (2006.01)
*H01M 10/6557* (2014.01)
(Continued)

(52) U.S. Cl.
CPC ... *H01M 10/6557* (2015.04); *B29C 45/14336* (2013.01); *B29C 65/1412* (2013.01);
(Continued)

(58) Field of Classification Search
CPC .. H01M 2/34; H01M 2220/20; H01M 10/486; H01M 10/625; H01M 10/6567
See application file for complete search history.

(56) References Cited

U.S. PATENT DOCUMENTS 5,366,822 A * 11/1994 Korall ............... H01M 2/20
429/157
8,465,863 B2 6/2013 Weber et al. ............ 429/120
(Continued)

FOREIGN PATENT DOCUMENTS

DE 102009016576 11/2009
DE 102010055389 7/2011
(Continued)

OTHER PUBLICATIONS

International Search Report and Written Opinion issued in application No. PCT/EP2015/051605, dated Mar. 31, 2015 (27 pgs).
(Continued)

*Primary Examiner* — Cynthia H Kelly
*Assistant Examiner* — Monique M Wills
(74) *Attorney, Agent, or Firm* — Hayes Soloway P.C.

(57) ABSTRACT

Disclosed is a method for producing a plate-shaped heat exchanger for batteries or converters for generating electricity, to a plate-shaped heat exchanger for batteries or converters for generating electricity, and to an assembly of plate-shaped heat exchangers and converter or battery cells. A plate-shaped heat exchanger includes two frame parts, which peripherally surround one profiled heat-conducting element each, wherein the profiles of the profiled heat-conducting elements form channels in the connected state of the frame parts, through which channels a fluid can be conducted. In the connected state, the frame parts form at least two supply channels for feeding and leading away of fluid, from which supply channels openings extend to the channels of the profiled heat-conducting elements. The
(Continued)

frame parts have at least one connection for the feeding and leading away of fluid for each supply channel, which connection can be connected to a connection of a frame part of a further heat exchanger.

17 Claims, 9 Drawing Sheets

(51) Int. Cl.
| | |
|---|---|
| H01M 2/10 | (2006.01) |
| H01M 10/647 | (2014.01) |
| H01M 2/34 | (2006.01) |
| H01M 10/48 | (2006.01) |
| H01M 10/625 | (2014.01) |
| H01M 10/6567 | (2014.01) |
| H01M 10/613 | (2014.01) |
| B29C 65/14 | (2006.01) |
| F28F 3/02 | (2006.01) |
| F28F 9/00 | (2006.01) |
| F28F 9/26 | (2006.01) |
| F28F 21/02 | (2006.01) |
| F28D 1/03 | (2006.01) |
| B29C 45/14 | (2006.01) |
| B29C 65/18 | (2006.01) |
| F28F 3/08 | (2006.01) |
| F28F 21/06 | (2006.01) |
| B29L 31/18 | (2006.01) |
| B29C 65/02 | (2006.01) |
| B29L 31/34 | (2006.01) |
| B29C 65/08 | (2006.01) |
| B29C 65/16 | (2006.01) |
| B29C 65/20 | (2006.01) |
| B29C 65/48 | (2006.01) |
| B29C 65/00 | (2006.01) |
| B29C 65/06 | (2006.01) |
| F28F 21/08 | (2006.01) |
| F28D 21/00 | (2006.01) |

(52) U.S. Cl.
CPC ............ *B29C 65/18* (2013.01); *F28D 1/0333* (2013.01); *F28F 3/025* (2013.01); *F28F 3/08* (2013.01); *F28F 9/001* (2013.01); *F28F 9/264* (2013.01); *F28F 21/02* (2013.01); *F28F 21/065* (2013.01); H01M 2/1077 (2013.01); H01M 2/34 (2013.01); H01M 10/486 (2013.01); H01M 10/613 (2015.04); H01M 10/625 (2015.04); H01M 10/647 (2015.04); H01M 10/6567 (2015.04); *B29C 65/02* (2013.01); *B29C 65/06* (2013.01); *B29C 65/08* (2013.01); *B29C 65/16* (2013.01); *B29C 65/20* (2013.01); *B29C 65/48* (2013.01); *B29C 66/54* (2013.01); *B29L 2031/18* (2013.01); *B29L 2031/3468* (2013.01); *F28D 2021/0029* (2013.01); *F28F 21/067* (2013.01); *F28F 21/085* (2013.01); *F28F 2230/00* (2013.01); *F28F 2255/146* (2013.01); *F28F 2275/14* (2013.01); *H01M 2/348* (2013.01); *H01M 2200/00* (2013.01); *H01M 2220/20* (2013.01)

(56) References Cited

U.S. PATENT DOCUMENTS

| | | | |
|---|---|---|---|
| 8,877,366 B2 | 11/2014 | Weber et al. | 429/120 |
| 2006/0021745 A1 | 2/2006 | Fritze et al. | 165/172 |
| 2011/0293985 A1* | 12/2011 | Champion | H01M 10/0413 429/120 |
| 2012/0040222 A1 | 2/2012 | Quick et al. | 429/120 |
| 2012/0177970 A1* | 7/2012 | Marchio | H01M 2/0237 429/120 |
| 2013/0071720 A1 | 3/2013 | Zahn | 429/120 |
| 2013/0171493 A1 | 7/2013 | Wayne et al. | 429/120 |
| 2014/0141287 A1* | 5/2014 | Bertucci | H01M 10/425 429/7 |

FOREIGN PATENT DOCUMENTS

| | | |
|---|---|---|
| DE | 102010021922 | 12/2011 |
| DE | 102010051106 | 5/2012 |
| DE | 102011053439 | 1/2013 |
| EP | 1630896 | 3/2006 |
| WO | WO2013037742 | 3/2013 |

OTHER PUBLICATIONS

International Preliminary Report on Patentability issued in application No. PCT/EP2015/051605, dated Aug. 9, 2016 (20 pgs).

* cited by examiner

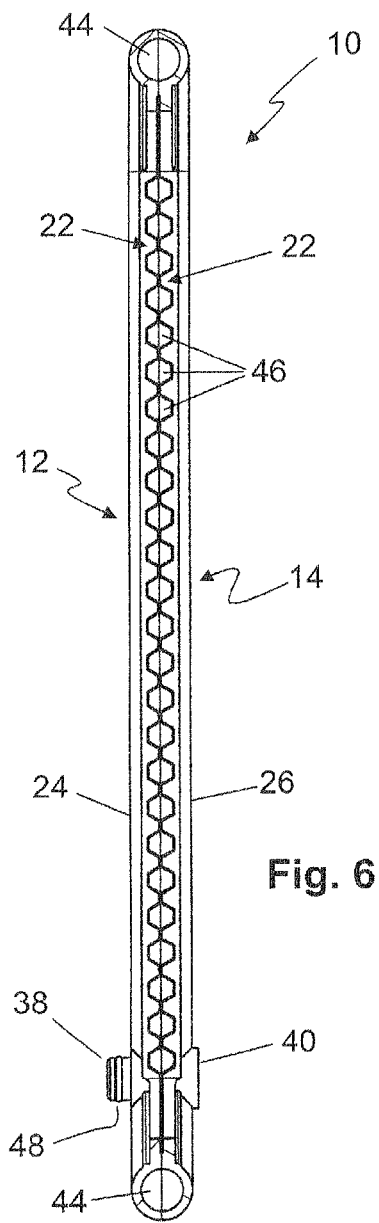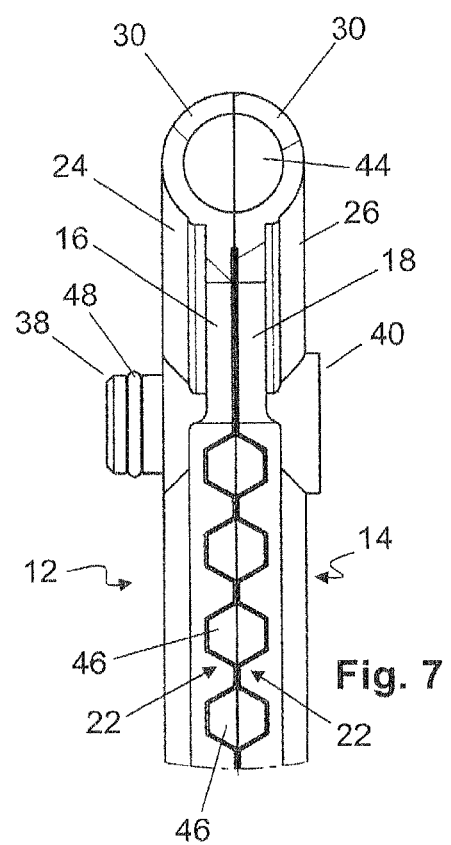

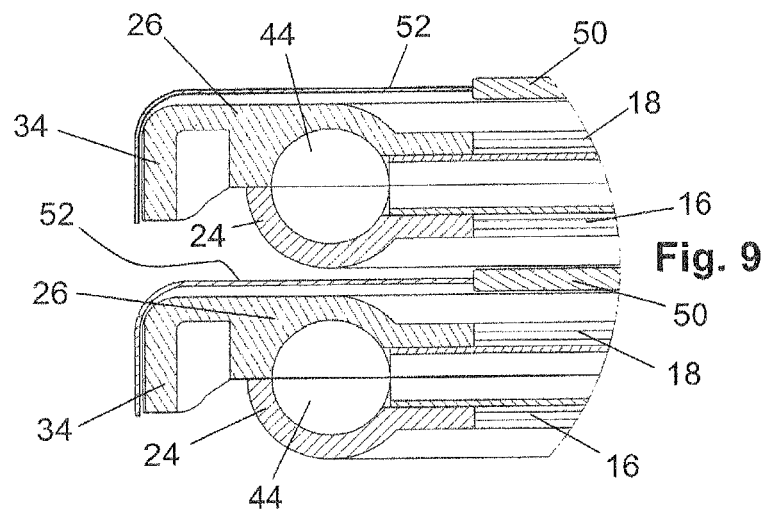
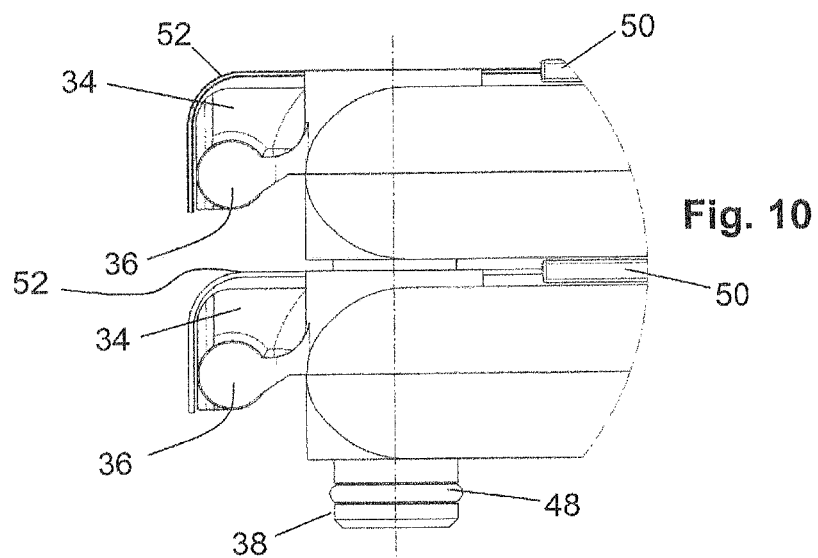

METHOD FOR PRODUCING A PLATE-SHAPED HEAT EXCHANGER, PLATE-SHAPED HEAT EXCHANGER, AND ASSEMBLY COMPRISING PLATE-SHAPED HEAT EXCHANGERS

BACKGROUND OF THE INVENTION

The present invention relates to a method for producing a plate-shaped heat exchanger, to a plate-shaped heat exchanger and to an assembly with plate-shaped heat exchangers.

Plate-shaped heat exchangers are used in high-power batteries particularly for the purpose of cooling the similarly plate-shaped battery cells. An assembly ('stack') of that kind usually comprises a plurality of battery cells which are electrically connected together. Arranged between these battery cells are the plate-shaped heat exchangers which are similarly connected with one another by way of, for example, a fluid circuit.

DE 10 2011 053 439 A1 discloses a temperature control module for an energy storage device, a stacking module for an energy storage device or for an electrical machine, and an energy storage device. The temperature control body comprises a first wall plate and a second, opposite wall plate. Arranged between the wall plates is a channel plate in which a channel—through which a liquid for cooling can flow—extends. The wall plates of the temperature control body can be covered with a thermally conductive layer. The connections for feed and discharge of liquid are so arranged that these protrude from a stack with several such temperature control bodies. The connections can then be supplied with a cooling liquid by way of a line.

DE 10 2010 055 389 A1 discloses a cooling plate for a lithium ion battery pack, wherein the cooling plates comprise a frame in which they are held and by way of which the feed and discharge of a cooling liquid takes place. For that purpose the frame has outwardly protruding projections. The outwardly protruding projections can, for liquid feed and discharge, be connected with further cooling plates and frames thereof so as to provide a common liquid feed and drain. However, these projections increase the space required for a stack composed of a plurality of such cooling plates. Moreover, these projections with the liquid openings have to be sealed. Due to the design of the frame, a seal can be achieved only by measures which in turn require an increased amount of space.

DE 10 2009 016 576 A1 discloses a method for producing and assembling batteries and the components thereof and also discloses a battery and the components thereof, in which a plurality of battery cooling plates is provided, the plates each having a path defined therein for liquid coolant, which path communicates with an inlet collecting duct aperture and an outlet collecting duct aperture, and several cooling plates are stacked on top of one another so that the inlet and outlet collecting duct apertures of each plate are aligned with the same of adjacent plates and with each of the inlet and outlet collecting duct apertures of adjacent ones.

US 2012/0040222 A1 discloses a frame with a corrugated cooling plate for an air-cooled battery, in which a planar, further cooling plate is arranged on either side of the corrugated cooling plate and the further cooling plates have an outwardly protruding rib at the edges thereof, wherein a frame surrounds an edge of the further cooling plates and the frame seals the edges of the further cooling plates.

DE 10 2010 021 972 A1 discloses a cooling element designed and arranged for disposition between electrochemical energy storage cells, the cooling element having a heat exchanger structure through which a heat carrier medium can flow and which is formed from two foil layers or foil layer structures, which are placed against one another by opposing surfaces and are connected at seam locations formed within the surfaces, wherein the seam locations bound, between the surfaces, cavities through which the heat carrier medium can flow.

SUMMARY OF THE INVENTION

The object of the present invention is therefore to indicate a method of producing a plate-shaped heat exchanger and also to indicate a plate-shaped heat exchanger and an assembly comprising a plurality of plate-shaped heat exchangers, in which the plate-shaped heat exchangers can be produced simply and rapidly and can be arranged or connected with respect to one another in such a way that an assembly of heat exchangers and converter or battery cells having a simple feed and discharge of a cooling liquid as well as a space-saving construction is provided.

The method according to the invention for producing a plate-shaped heat exchanger for batteries or converters for power generation comprises the following steps:
  injection-moulding around a first profiled thermal conduction element at the outer circumference thereof with a plastics material to form a first frame part with formation of two supply channel halves, from which depressions extend to the profiled thermal conduction element, and a respective connection for each supply channel half,
  injection-moulding around a second profiled thermal conduction element at the outer circumference thereof with a plastics material to form a second frame part with formation of two supply channel halves, from which depressions extend to the profiled thermal conduction element, and a respective connection for each supply channel half,
  connecting the first frame part with the second frame part, wherein the first frame part is brought into conjunction with the second frame part in such a way that the profiles of the profiled thermal conduction elements face towards and bear against one another, the supply channel halves of the first and second frame parts form supply channels and the depressions form openings from the supply channels to the channels formed by the profiles of the profiled thermal conduction elements,
  wherein the connections of the first and second frame parts are so constructed that the connections of the first frame part of the heat exchanger can be connected with the connections of a second frame part of a further heat exchanger.

The method makes possible simple and rapid production of a plate-shaped heat exchanger, in which two frame parts, i.e. a first frame part and a second frame part, are produced for a plate-shaped heat exchanger.

By contrast to the prior art, in this production method the two components needed for the plate-shaped heat exchanger are produced quickly and simply, in which case there is no longer a need for further components. Known plate-shaped cooling elements from the prior art require several processing steps for production of the components required for that purpose. The method according to the invention is distinguished by injection-moulding around a thermal conduction element, in which case it remains only to connect together two frame parts formed therefrom.

In the method, the plastics material is so joined to the first and second thermal conduction elements and the depressions are constructed in such a way that the half channels or semicircular openings formed by the depressions bear congruently against the half channels formed by the profile of the first and second thermal conduction elements.

The connection of the plastics material of the first frame part with the plastics material of the second frame part can be carried out by way of a plastics material joining method, for example laser welding, vibration welding, butt-welding with heat reflectors, infrared radiation welding or ultrasonic welding. For that purpose, heat is introduced over a large area at least to the plastics material, which heat causes melting together of the plastics material at the regions of the first frame part and the second frame part lying against one another.

The connection of the profiled thermal conduction elements can be carried out by means of hot stamping. This is appropriate primarily when metal thermal conduction elements coated with melt adhesive are used.

The joining of the profiled frames as well as the adhesion of the profiled thermal conduction elements can be carried out by means of combined joining methods, such as, for example, infrared radiation welding and hot stamping, in one process step.

The welding can in that case be carried out by means of heating plates, wherein for this purpose a separate connection of the plastics material of the first frame part and of the second frame part is not absolutely necessary. Heating plates can be applied to the thermal conduction elements of the first and second frame parts and heat—which is introduced for hot-melt adhesion of the thermal conduction element of the first frame part and the thermal conduction element of the second frame part—can additionally produce welding or connection of the plastics material of the first frame part with the plastics material of the second frame part. As a result, connection of the first frame part with the second frame part for production of a plate-shaped heat exchanger is also carried out simply and quickly in a single working step. This also has an effect on, in particular, the cost of producing plate-shaped heat exchangers of that kind. Moreover, a multiplicity of components is no longer needed for the plate-shaped heat exchangers according to the invention. Merely the first frame part and the second frame part have to be connected together, these each being formed by injection-moulding plastics material around a thermal conduction element.

A plate-shaped heat exchanger according to the invention for batteries or converters for power generation consists of two plate parts of plastics material which are connected together and which each surround a profiled thermal conduction element by encircling and are connected with the profiled thermal conduction elements at the outer circumference thereof. The profiles of the profiled thermal conduction elements in the connected state of the frame parts form channels through which a fluid can be conducted. In the connected state, the frame parts form at least two supply channels for fluid feed and/or discharge, from which openings to the channels of the profiled thermal conduction elements extend, wherein the frame parts each have for each supply channel at least one connection for fluid feed and/or discharge, this being connectible with a connection of a frame part of a further heat exchanger. The connections of the frame parts of a heat exchanger are so constructed that the connections of a first frame part of a heat exchanger are connectible with the connections of a second frame part of the further heat exchanger.

The plate-shaped heat exchanger has a simple construction, in which the channels as well as supply channels for the feed and discharge of the fluid can be formed in simple manner in the plate-shaped heat exchanger, since these are formed by so-called half channels. The plate-shaped heat exchanger can be connected with further plate-shaped heat exchangers by way of the connections, these being of corresponding construction. The connection of a first frame part can in addition be insertable into the connection of a second frame part. Moreover, the connection of the first frame part can have a notch which is surrounded by a sealing ring. It is thereby ensured that fluid does not escape from the cooling circuit.

The thermal conduction elements can consist of metal or graphite. Metal offers the advantage that the thermal conduction elements can be welded or glued together, in which case the resulting heat also allows welding or connecting of the frame parts of plastics material. Thermal conduction elements of graphite offer the advantage that they have a higher heat transmission capability as well as a chemically higher stability (inert) relative to specific metals.

The first and second frame parts can be so constructed that a converter cell or battery cell arranged between two plate-shaped heat exchangers bears against the thermal conduction elements of the plate-shaped heat exchangers. The plate-shaped heat exchanger has for that purpose an appropriate shape corresponding with its later use, given that converter cells or battery cells for high-power batteries have specific sizes. The first or second frame part can have support webs for electrical contacts of the converter cell or battery cell. In the case of a stacked arrangement of plate-shaped heat exchangers and converter or battery cells, electrical contacts are led out of this assembly of cells and heat exchangers and correspondingly laid on the support webs.

The first or second frame part can also have at least one mounting pin. Mounting pins serve as, for example, plug connecting elements so as to, for example, be able to connect battery cells together by way of the electrical connections thereof or also to be able to selectably separate them if, for example, a battery cell has become unusable. The mounting pins can also serve for fastening and/or locking of heat exchangers to, for example, a stacking device.

In the case of an assembly according to the invention comprising a plurality of plate-shaped heat exchangers and converter or battery cells, wherein the converter or battery cells are arranged in stacked manner and a respective plate-shaped heat exchanger is arranged between the converter or battery cells, the plate-shaped heat exchangers are the heat exchangers described herein. The plate-shaped heat exchangers are connected together in the assembly by way of the connections and connected with a device for the feed and discharge of fluid.

The device can be constructed for cooling and for circulating the fluid. Circulating and cooling devices of that kind are known from the prior art.

The converter cells or battery cells can be electrically connected together by way of an isolating device. The isolating device can also be connected with the converter cells or battery cells by way of the plate-shaped heat exchangers.

Advantageously, resulting by way of the construction of the connections of the plate-shaped heat exchangers is a simple possibility of joining these together to form an assembly or a stack.

It is particularly advantageous with the plate-shaped heat exchangers if two frame parts are formed which have respective half channels (half channels are also formed by the thermal conduction elements due to the profiles), which by virtue of the connecting or welding subsequently provide the channels for the fluid for cooling. According to the invention, the construction of channels and of the heat exchanger is in that case carried out in a single connecting step. The size of the channels (supply channel, etc.) is to be selected in dependence on the converter cells or battery cells to be cooled. This also applies to the size of the frame parts, the thermal conduction elements and the plate-shaped heat exchanger. The selection of the materials (plastic, metal or graphite) also always has to depend on the field of use. Thus, in the case of high-power batteries large amounts of heat often have to be dissipated. For this reason, an appropriate fluid for the cooling also has to be selected, wherein in simple forms of embodiment air cooling can be carried out, but in most applications cooling liquids with an appropriate property for heat transport have proved to be the better solution.

The assembly can be extended by at least one plate-shaped heat exchanger and by at least one converter cell or battery cell.

In further forms of embodiment the assembly comprises a monitoring unit constructed for the purpose of carrying out at least one monitoring of state and/or monitoring of temperature of the converter cells or battery cells. State monitoring comprises, for example, monitoring the state of charge of the battery cells.

The assembly can additionally comprise an isolating device which, depending on the states determined by the monitoring unit, electrically isolates at least one converter cell or battery cell if the states exceed predeterminable limits.

The isolating device can be a pyrotechnically operating device or an electrically, magnetically or mechanically operating device.

A contact system enhancing safety is provided by such a modular assembly, which is constructed to be capable of extension as a function of the number of converter cells or battery cells and which comprises an electronic regulating system (monitoring unit: temperature monitoring as well as state monitoring of the converter cells or battery cells), for example by way of a separate electronic module of modular construction seated on the assembly. Converter or battery cells can in critical cases be raised by way of the externally acting isolating device (pyrotechnical device, electrical lifting device, magnetic lifting device, mechanically biased lifting device) so that the converter or battery cells are separated from one another. If a cell should fuse, which would usually lead to a chain reaction and consequently to self-destruction of the entire unit, the isolating device separates the converter cells or battery cells from one another. For that purpose, a separate monitoring unit and an associated separate isolating device can be provided for each converter or battery cell.

BRIEF DESCRIPTION OF THE DRAWINGS

Further objects, features, advantages and possibilities of use are evident from the following description of embodiments, which are not be understood as restrictive, with reference to the associated drawings. In that case, all described and/or pictorially illustrated features by themselves or in any desired combination form the subject disclosed herein, regardless of the grouping thereof in the claims or the dependencies thereof. The sizes and proportions of the components shown in the figures in that regard are not necessarily to scale. In forms of embodiment to be realised, they can differ from those illustrated.

In the drawings:

FIG. 6 shows a sectional view of a plate-shaped heat exchanger;

FIG. 7 shows a partly sectioned view of a plate-shaped heat exchanger;

FIG. 9 shows a sectional view of two plate-shaped heat exchangers and adjoining battery cells;

FIG. 10 shows a further view of two plate-shaped heat exchangers and adjoining battery cells in the region of the contacts.

DETAILED DESCRIPTION OF THE DRAWINGS

Figure 1:
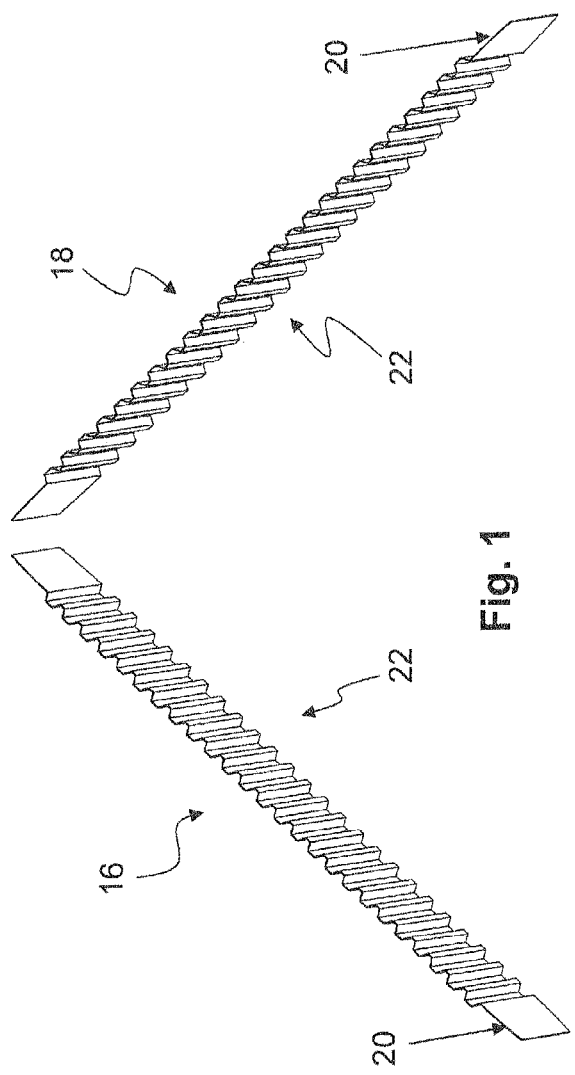
FIG. 1 shows a perspective view of two thermal conduction elements.

FIG. 1 shows a perspective view of two thermal conduction elements 16 and 18. The first thermal conduction element 16 and the second thermal conduction element 18 each have a profile 22 which forms so-called half channels substantially in longitudinal direction. These half channels of the first thermal conduction element 16 and of the second thermal conduction element 18 form, in the joined-together state of the two thermal conduction elements 16, 18, channels 46 as indicated in more detail later.

The first thermal conduction element 16 and the second thermal conduction element 18 consist of a thermally conductive metal. However, the first thermal conduction element 16 and the second thermal conduction element 18 can also consist of graphite, which has a higher thermal conductivity than, for example, copper.

A plastics material is injection-moulded around the circumferential edge 20 of the first thermal conduction element 16 and the second thermal conduction element 18 so as to form a first frame part 12 and a second frame part 14. For that purpose, the first thermal conduction element 16 and the second thermal conduction element 18 are each placed in an appropriate injection-moulding mould and subsequently a suitable plastics material is injected around these.

Figure 2:
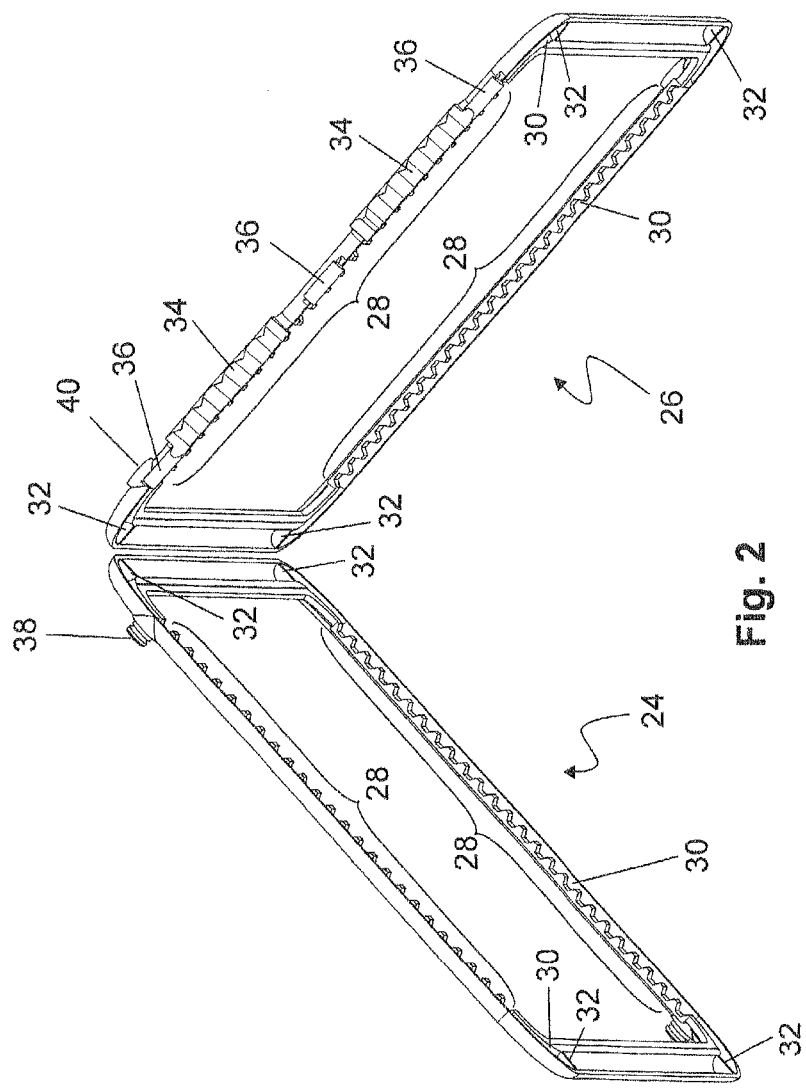
FIG. 2 shows a perspective view of two plastics material frames.

FIG. 2 shows a perspective view of two plastics material frames 24 and 26, which are injection-moulded and constructed on the circumferential edge 20 of the first thermal conduction element 16 and of the second thermal conduction element 18. In FIG. 2 the first plastics material frame 24 and the second plastics material frame 26 are illustrated without the first thermal conduction element 16 and the second thermal conduction element 18. However, in the case of production of the first frame part 12 and the second frame part 14 for a heat exchanger 10 there is no separate production of the first and second plastics material frames 24, 26 without the thermal conduction elements 16 and 18. As already indicated, the first plastics material frame 24 and the second plastics material frame 26 are not produced separately from the thermal conduction elements 16, 18, but are injection-moulded on these. However, FIG. 2 shows the first plastics material frame 24 and the second plastics material frame 26 separately from the first and second thermal conduction elements 16, 18.

The first plastics material frame 24 and the second plastics material frame 26 are of substantially identical construction, but the second plastics material frame 26 additionally has support webs 34 and mounting pins 36. In addition, the first plastics material frame 24 and the second plastics material frame 26 differ in the connections 38 and 40, as described more specifically further below. The first plastics material frame 24 and the second plastics material frame 26 otherwise correspond with one another, just as the first thermal conduction element 16 is constructed substantially the same as the second thermal conduction element 18. The support webs 34 of the second plastics material frame serve as a support surface for contacts 52 for battery cells 50, in which case the contacts 52 rest on the support webs 34 in such a way that easy contact-making with the battery cells 50 is possible.

The first plastics material frame 24 and the second plastics material frame 26 have depressions 28. The depressions 28 are constructed so that they substantially correspond with the half channels formed by the profile 22 of the first thermal conduction element 16 and the second thermal conduction element 18. The first and second plastics material frames 24, 26 are in addition so constructed that supply channel halves 30 are formed around the circumferential edges 20 of the first and second thermal conduction elements 16, 18. The supply channel halves 30 have a substantially U-shaped or semicircular cross-section, the individual supply channel halves 30 being bounded by webs 32. The first and second plastics material frames 24, 26 are so constructed that the U-shaped or semicircular cross-section is maintained over the entire (peripheral) length of the first and second plastics material frames 24, 26. In the joined-together state, the supply channel halves 30 form supply channels 44 and the depressions 28 of the first and second plastics material frames 24, 26 form openings, through which a fluid passes from the supply channels 44 to the channels 46, which are formed by the first and second thermal conduction elements 16 and 18. The separation by way of the webs 32 ensures that throughflow either from 'top' to 'bottom' or from 'bottom' to 'top' can take place.

Figure 3:
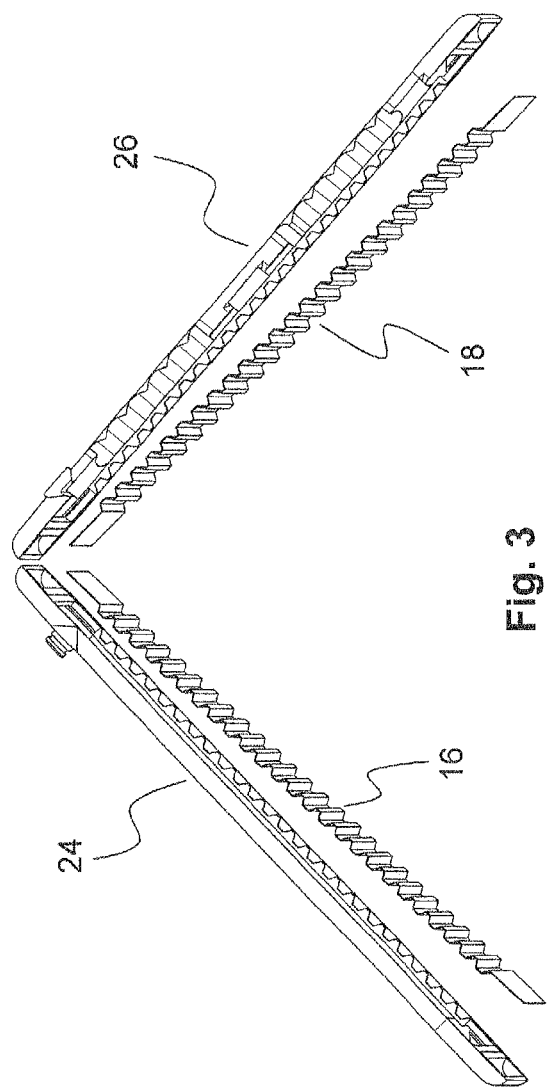
FIG. 3 shows a perspective view of two plastics material frames with two thermal conduction elements.

FIG. 3 shows a perspective view of two plastics material frames 24, 26 with two thermal conduction elements 16, 18. As apparent from FIG. 3, the depressions 28 are correspondingly arranged in such a way that the depressions 28 bear congruently against the half channels formed by the profile 22. In order to provide congruency of the depressions 28 with the profile 22 of the first and second thermal conduction elements 16 and 18, the injection-moulding moulds for the first frame part 12 and the second frame part 14 are constructed so as to guarantee congruency.

Figure 4:
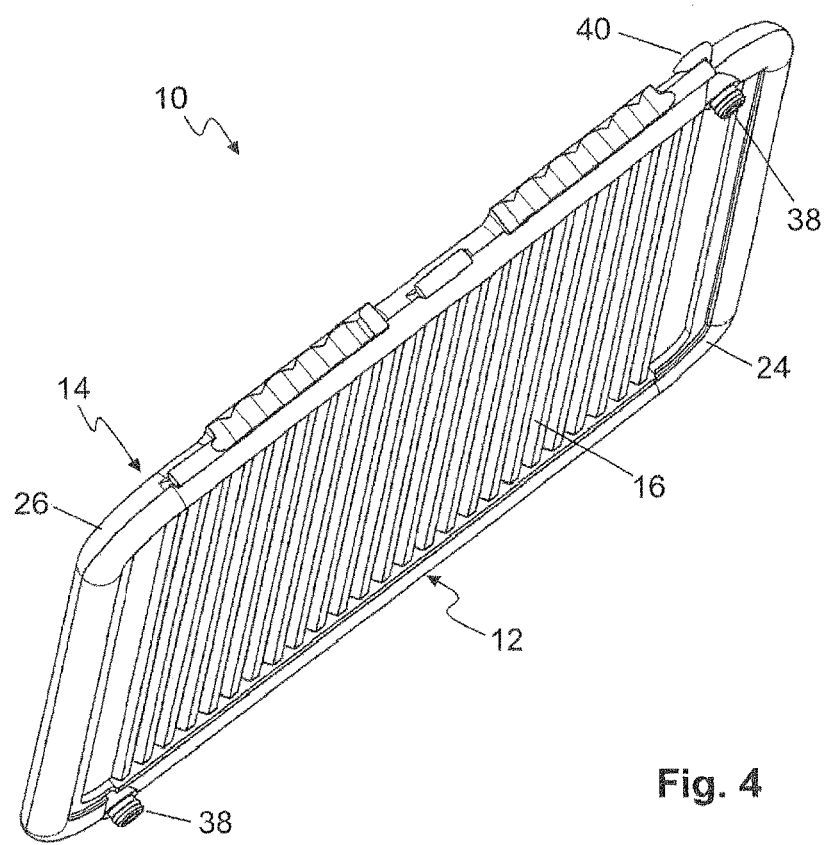
FIG. 4 shows a perspective view of a plate-shaped heat exchanger.

FIG. 4 shows a perspective view of a plate-shaped heat exchanger 10. The first frame part 12 comprises a thermal conduction element 16 and a plastics material frame 24 which is injection-moulded on the thermal conduction element 16 and surrounds the first thermal conduction element 16. In addition, the first frame part 12 has connections 38. By way of the connections 38, the first frame part 12 of a heat exchanger 10 can be connected with a second frame part 14 of a further heat exchanger 10 via the correspondingly constructed connections 40 thereof. In addition, a device (not illustrated in the figures) for the feed of a coolant/fluid can also be connected by way of the connections 38.

Figure 5:
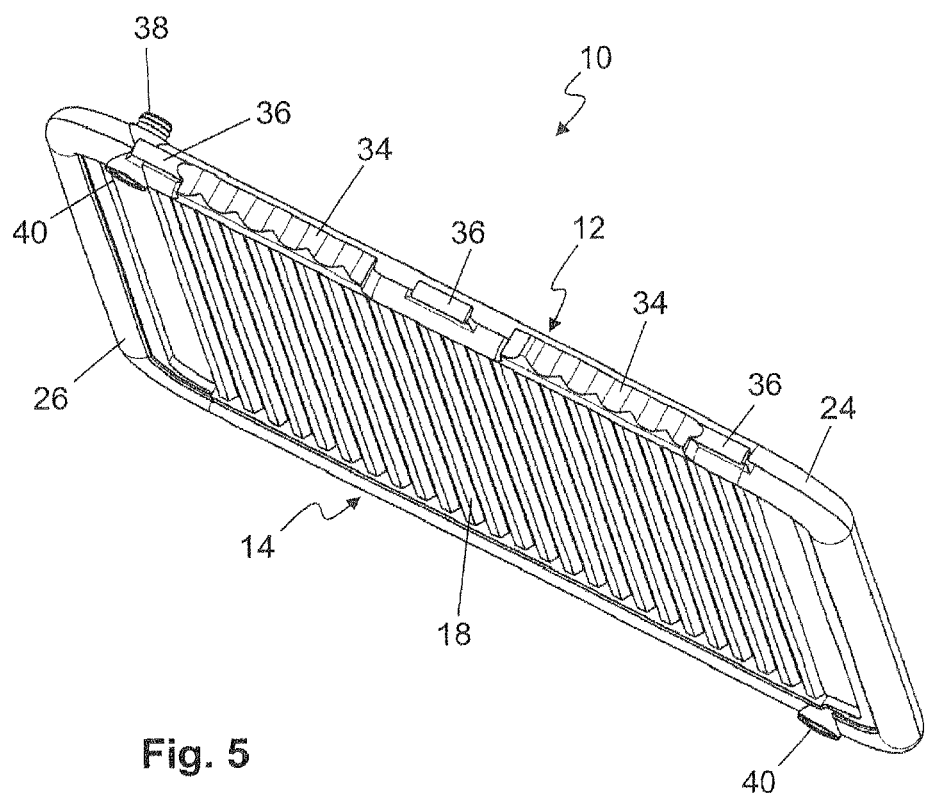
FIG. 5 shows a further perspective view of a plate-shaped heat exchanger.

FIG. 5 shows a further perspective view of a plate-shaped heat exchanger 10. The second frame part 14 comprises a second thermal conduction element 18 as well as a second plastics material frame 26 surrounding the second thermal conduction element 16 and injection-moulded on the second thermal conduction element 18. The second plastics material frame 26 has, apart from the support webs 34 and the mounting pins 36, connections 40 which are so constructed that the connections 38 of the first frame part 12 can be inserted into the connections 40.

FIG. 6 shows a sectional view of a plate-shaped heat exchanger 10. The plate-shaped heat exchanger 10 comprises a first frame part 12 and a second frame part 14. The first frame part 12 is formed by a first thermal conduction element 16 and a plastics material frame 24 injection-moulded on the first thermal conduction element 16 and surrounding the first thermal conduction element 16. The second frame part 14 comprises a second thermal conduction element 18 as well as a second plastics material frame 26 surrounding the second thermal conduction element 18 and injection-moulded on the second thermal conduction element 18. The first and second frame parts 12 and 14 are connected together by welding, the welding being carried out in the region of the first and second thermal conduction elements 16, 18. The profiles 22 of the first thermal conduction element 16 and the second thermal conduction element 18 are so connected together by way of induction of heat that the half channels of the profiles 22 form channels 46. In addition, fusing together of the plastics materials of the first plastics material frame 24 and the second plastics material frame 26 takes place by way of the heat induction. As a result, supply channels 44, by way of which a fluid flowing through the channels 46 can be fed, are formed. When the fusing of the plastics material of the first plastics material frame 24 to the plastics material of the second plastics material frame 26 takes place, those regions of the plastics material which bear against one another fuse together and connect with one another. Fusing of the webs 32 of the plastics material frame 24 to the corresponding opposite webs 32 of the plastics material frame 26 therefore also takes place.

By way of the depressions 28, which in the joined-together state of the first and second frame parts 12, 14 form openings or again small channels, a fluid can flow from the supply channel 44 via the openings formed by the depressions 28 and via the channels 46 as well as via the opposite openings formed by the depressions 28 to the opposite supply channel 44, the fluid being supplied and passed on by way of the connections 38 and 40.

As can be inferred from FIGS. 4 and 5, the connections 38 and 40 can be arranged to be offset relative to one another. As a result, throughflow of the heat exchanger 10 from 'top' to 'bottom' or from 'bottom' to 'top' takes place depending on the feed of a fluid, in which case there is uniform distribution by way of the channels 46.

Figure 8:
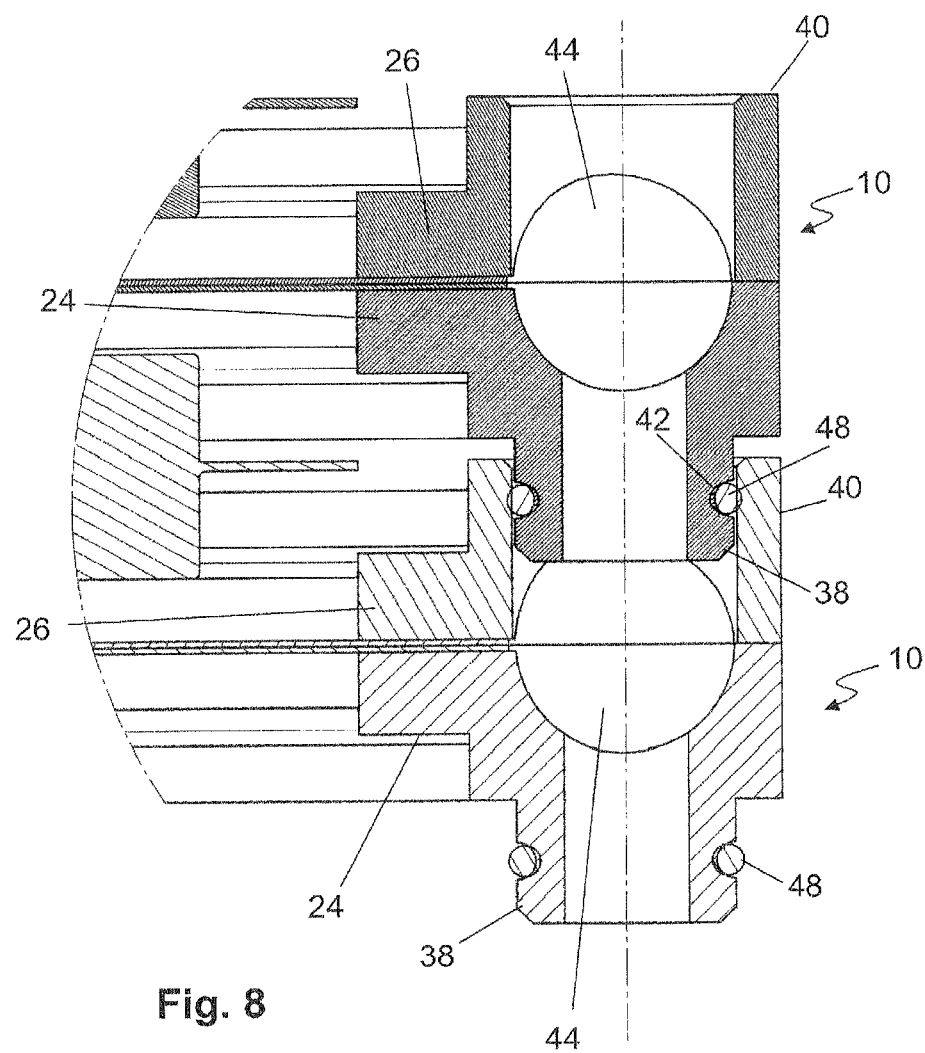
FIG. 8 shows a sectional view of two connected plate-shaped heat exchangers.

The connections 38 and 40 are in addition illustrated in FIG. 6, wherein the connection 38 has a sealing ring 48 received in a correspondingly formed notch 42 (FIG. 8). The connections 38 and 40 are constructed so that the connection 38 of the first frame part 12 can be inserted into the connection 40 of the second frame part 14. A stacked arrangement of heat exchangers 10 adjacent to one another is thereby possible without the heat exchangers needing separate feed lines or arrangements, which in particular require further means or protrude from the assembly from outside, for the supply and discharge of a fluid. The connections 38 and 40 protrude from the heat exchanger 10 by a specific amount. This results in a certain spatial distance between two heat exchangers 10 arranged adjacent to one another. The space thus created serves for reception of battery cells 50 or converter cells. The form of the connections 38 and 40 can, however, also differ from the construction shown in the figures. The design always has to be in accordance with the battery cells 50 or converter cells to be received as well as the rest of the design of the heat exchanger 10.

FIG. 7 shows a partly sectioned view of a plate-shaped heat exchanger 10 in the region of the connections 38 and 40. As can be clearly inferred from FIG. 7, the profiles 22 of the first thermal conduction element 16 and the second thermal conduction element 18 in the joined together state of the first frame part 12 and the second frame part 14 form channels 46. The same applies to the depressions 28 of the first plastics material frame 24 of the first frame part 12 and the depressions 28 of the second plastics material frame 26 of the second frame part 14.

Moreover, supply channels 44 are formed by way of the supply channel halves 30 of the first frame part 12 and the second frame part 14. A sealing ring 48 is placed on the notch 42 of the connection 38 and prevents fluid for cooling being able to escape in the inserted state of the connection 38 in a connection 40.

FIG. 8 shows a sectional view of two connected plate-shaped heat exchangers 10. FIG. 8 clearly shows how the arrangement of heat exchangers 10 is realised. The connection 38 of a first plastics material frame 24 of the first frame part 12 of a heat exchanger 10 is in that case inserted into the connection 40 of a second plastics material frame 26 of the second frame part 14 of the further heat exchanger 10. It is ensured by way of the sealing ring 48 that no coolant or fluid can escape. A battery cell or converter cell, which is to be cooled, is arranged between heat exchangers 10.

FIG. 9 shows a sectional view of two plate-shaped heat exchangers 10 and adjacent battery cells 50 in the region of the contacts 52. The contacts 52 of battery cells 50 are led out of the space between two heat exchangers 10 by way of the support webs 34. A relatively large contact area is provided by way of the design of the support 34 and the supporting of the contacts 52. The battery cells 50 are so arranged between the heat exchangers 10 that they lie between the first thermal conduction element 16 and the second thermal conduction element 18. As illustrated in FIG. 9, the first and second thermal conduction elements 16, 18 are also constructed in such a way that further layers (thermally conductive) are applied on the outer side, i.e. facing the battery cells 50, or, however, the first and second thermal conduction elements 16 and 18 are constructed so that in correspondence with the area of the heat exchanger 10 they protrude as far as the region of the supply channels 44 and are flush therewith.

FIG. 10 shows a further view of two plate-shaped heat exchangers 10 and adjoining battery cells in the region of the contacts 52. In this case, the arrangement of the mounting pins 36 as well as the design of the connection 38 with sealing ring 48 are illustrated to enlarged scale. In addition, FIG. 10 makes it clear that the battery cells 50 bear directly against the heat exchangers 10.

Figure 11:
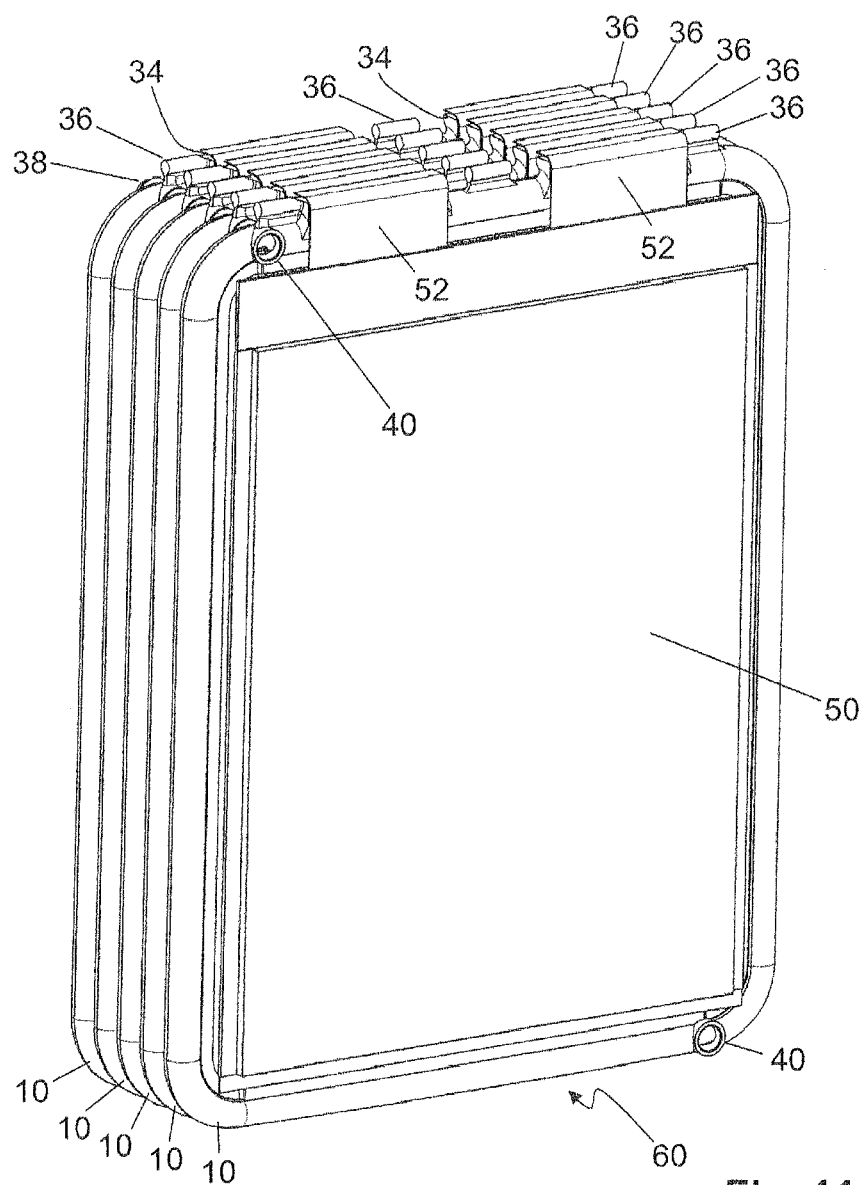
FIG. 11 shows a perspective schematic view of an assembly of battery cells and plate-shaped heat exchangers.

FIG. 11 shows an assembly 60 of battery cells 50 and plate-shaped heat exchangers 10. By virtue of the design of the plate-shaped heat exchangers 10, particularly with the connections 40 and 38, a space-saving arrangement results. Moreover, it is sufficient to feed a fluid for cooling the battery cells 50 to the assembly 60 only to and from a first heat exchanger 10 or a last heat exchanger 10 by way of lines or other devices. The throughflow of the heat exchangers 10 arranged therebetween is realised by way of the connection of the connections 38 and 40. The contacts 52 of the battery cells 50 protrude from the region between two heat exchangers 10 and are laid over the support webs 34 and rest on these for further contact-making. An assembly 60 of that kind can comprise further battery cells 50 and heat exchangers 10. The illustration selected in FIG. 11 is only by way of example and shows a detail of an assembly 60 for, for example, high-power batteries for motor vehicles.

REFERENCE NUMERAL LIST

10 heat exchanger
12 first frame part
14 second frame part
16 first thermal conduction element
18 second thermal conduction element
20 circumferential edge
22 profile
24 first plastics material frame
26 second plastics material frame
28 depression
30 supply channel halves
32 web
34 support web
36 mounting pin
38 connection
40 connection
42 notch
44 supply channel
46 channel
48 sealing ring
50 battery cell
52 contact
60 assembly

The invention claimed is:

1. A plate-shape heat exchanger for batteries or converters for power generation, consisting of two interconnected frame parts of plastics material, which each surround a profiled thermal conduction element by encircling and which are connected with the profiled thermal conduction elements at the outer circumference thereof, wherein the profiles of the profiled thermal conduction elements in the connected state of the frame parts face each other and form channels between the connected profiled thermal conduction elements through which a fluid can be fed and wherein the frame parts in the connected state form at least two supply channels for the feed and/or discharge of fluid, from which openings to the channels of the profiled thermal conduction elements extend, wherein the frame parts each have for each supply channel at least one connection for the feed and/or discharge of fluid, which connection is connectible with a connection of a frame part of a further heat exchanger, wherein the connections of the frame parts of a heat exchanger are so constructed that the connections of a first frame part of the heat exchanger are connectible with the connections of a second frame part of the further heat exchanger.

2. The plate-shaped heat exchanger according to claim 1, wherein the connection of a first frame part is insertable into the connection of a second frame part.

3. The plate-shaped heat exchanger according to claim 2, wherein the connection of the first frame part has a notch which is surrounded by a sealing ring.

4. The plate-shaped heat exchanger according to claim 1, wherein the thermal conduction elements are formed of metal or graphite.

5. The plate-shaped heat exchanger according to claim 1, wherein the first or second frame part has support webs for electrical contacts of converter cells or battery cells.

6. The plate-shaped heat exchanger according to claim 1, wherein the first or second frame part has at least one mounting pin.

7. An assembly comprising a plurality of plate-shaped heat exchangers and converter or battery cells, wherein the converter or battery cells are arranged in a stack and a respective plate-shaped heat exchanger of claim 1 is arranged between the converter or battery cells, wherein the plate-shaped heat exchangers are connected together by way of the connections and are connected with a device for the feed and discharge of fluid.

8. The assembly according to claim 7, wherein the device is constructed for cooling and circulating the fluid.

9. The assembly according to claim 7, wherein the converter cells or battery cells are electrically connected together by an isolating device.

10. The assembly according to claim 7, wherein the assembly can be extended by at least one plate-shaped heat exchanger and by at least one converter cell or battery cell.

11. The assembly according to claim 7, comprising a monitoring unit which is constructed for the purpose of carrying out at least monitoring of state and/or monitoring of temperature of the converter cells or battery cells.

12. The assembly according to claim 11, comprising an isolating device which depending on the states determined by the monitoring unit electrically isolates at least one converter cell or battery cell if the states exceed predeterminable limits.

13. The assembly according to claim 12, wherein the isolating device is a pyrotechnically operating device or an electrically, magnetically or mechanically operating device.

14. A method of producing a plate-shaped heat exchanger for batteries or converters for power generation as claimed in claim 1, comprising the steps of:
   injection-moulding around a first profiled thermal conduction element at the outer circumference thereof with a plastics material so as to form a first frame part with formation of two supply channel halves, from which depressions extend to the profiled thermal conduction element, and a respective connection for each supply channel half,
   injection-moulding around a second profiled thermal conduction element at the outer circumference thereof with a plastics material so as to form a second frame part with formation of two supply channel halves, from which depressions extend to the profiled thermal conduction element, and a respective connection for each supply channel half,
   connecting the first frame part with the second frame part, wherein the first frame part is brought into conjunction with the second frame part in such a way that the profiles of the profiled thermal conduction elements face towards and bear against one another and the supply channel halves of the first and second frame parts form supply channels and the depressions form openings from the supply channels to the channels formed by the profiles of the profiled thermal conduction elements,
wherein the connections of the first and second frame parts are so constructed that the connections of the first frame part of the heat exchanger can be connected with the connections of a second frame part of a further heat exchanger.

15. The method according to claim 14, wherein the connecting of the plastics material of the first frame part with the plastics material of the second frame part is carried out by way of welding.

16. The method according to claim 14, wherein the connecting of the profiled thermal conduction elements is carried out by adhesion under applied heat.

17. The method according to claim 15, wherein the welding is carried out by heating plates or infrared radiation welding.

* * * * *